United States Patent
Vargantwar

(10) Patent No.: US 8,615,240 B1
(45) Date of Patent: Dec. 24, 2013

(54) METHODS AND SYSTEMS FOR FACILITATING HANDOFF

(75) Inventor: Sachin R. Vargantwar, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 140 days.

(21) Appl. No.: 12/983,683

(22) Filed: Jan. 3, 2011

(51) Int. Cl.
*H04W 36/00* (2009.01)

(52) U.S. Cl.
USPC ........... 455/437; 455/436; 455/438; 455/439; 455/440; 455/441; 455/442; 455/443; 455/444

(58) Field of Classification Search
USPC .................................................. 455/436–444
See application file for complete search history.

(56) References Cited

U.S. PATENT DOCUMENTS

| 7,848,292 | B2 * | 12/2010 | Bl et al. ........................ 370/331 |
| 2008/0113670 | A1 | 5/2008 | Dufour et al. | |
| 2008/0227455 | A1 * | 9/2008 | Kim ............................... 455/436 |
| 2009/0047961 | A1 * | 2/2009 | Kim ............................... 455/436 |
| 2010/0232327 | A1 * | 9/2010 | Kim et al. ...................... 370/311 |
| 2010/0278150 | A1 * | 11/2010 | Park et al. ...................... 370/332 |

FOREIGN PATENT DOCUMENTS

WO    WO02/35861 A2    5/2002

\* cited by examiner

*Primary Examiner* — Lester Kincaid
*Assistant Examiner* — Mehmood B. Khan

(57) ABSTRACT

Methods and systems are provided for facilitating a handoff to a target sector that is not in the neighbor list of a mobile station's current source sector. In at least one embodiment, a mobile station detects (i) that a target sector is a handoff candidate and (ii) that the target sector is not listed in a neighbor list of a source sector; requests to be served by the target sector at least in part by sending an access probe to the target sector; and transitions from engaging in an active communication session via a communication path not including the target sector to doing so via a communication path that does include the target sector. The access probe may include an indication that the mobile station is in an active state. In at least one embodiment, at least one network entity may carry out the one or more network-side aspects that may facilitate the above-described method.

21 Claims, 4 Drawing Sheets

METHODS AND SYSTEMS FOR FACILITATING HANDOFF

BACKGROUND

1. Cellular Wireless Networks

Many people use mobile stations, such as cell phones and personal digital assistants (PDAs), to communicate via cellular wireless networks. These mobile stations and networks typically communicate with each other over a radio frequency (RF) air interface according to a wireless protocol such as Code Division Multiple Access (CDMA), perhaps in conformance with one or more industry specifications such as IS-95 and IS-2000. Wireless networks that operate according to these specifications are often referred to as "1xRTT networks" (or "1x networks" for short), which stands for "Single Carrier Radio Transmission Technology." Another CDMA protocol that may be used is known as Evolution Data Optimized (EV-DO), perhaps in conformance with one or more industry specifications such as IS-856. Other protocols may be used as well, such as Global System for Mobile Communications (GSM), Time Division Multiple Access (TDMA), WiMax, and/or any others.

These networks typically provide services such as voice, Short Message Service (SMS) messaging, and packet-data communication, among others, and typically include a plurality of base stations, each of which provide one or more coverage areas, such as cells and sectors. When a mobile station is positioned in one of these coverage areas, it can communicate over the air interface with the base station(s), and in turn over one or more circuit-switched and/or packet-switched signaling and/or transport networks to which the base station(s) provide(s) access.

Mobile stations and base stations conduct communication sessions (e.g. voice calls and data sessions) over frequencies known as carriers, each of which may actually be a pair of frequencies, with the base station transmitting to the mobile station on one of the frequencies, and the mobile station transmitting to the base station on the other. This is known as frequency division duplex (FDD). The base-station-to-mobile-station link is known as the forward link, while the mobile-station-to-base-station link is known as the reverse link. Furthermore, using a sector as an example of a coverage area, base stations may provide service in a given sector on one carrier, or on more than one. "Sector" may be used generally herein to refer to the wireless coverage area and/or the entities which function to radiate and manage operation of that coverage area.

2. Handoff

Still using sectors as examples of wireless coverage areas, it is the case that, from time to time, a mobile station that is in communication with a given sector may cooperate with the network to perform an operation known as a "handoff," by which the mobile station then begins communicating with a sector via which the mobile station was not communicating prior to the handoff being effected (i.e., conducted). To inform mobile stations as to their one or more handoff options (i.e. and e.g., one or more candidate target sectors), macro base stations typically broadcast a "neighbor list," which is a set of data that may include pseudorandom-number (PN) offsets in use by neighboring sectors. In general, a PN offset is a numerical code that base stations use to encode—and mobile stations use to decode—information transmitted over an air interface. Typically, it is by PN offset that mobile stations distinguish among base stations, or among various sectors of a given base station. In a typical cellular network, each sector (i.e. the hardware and software of a given base station responsible for providing service in the sector) has an associated neighbor list, which the base station broadcasts in the sector. Each such neighbor list typically contains the PN offsets of surrounding (target) sectors that could possibility receive a handoff from that (source) sector.

OVERVIEW

Due to changing network topography and/or shifting network conditions, among other possible reasons, a mobile station may receive signals broadcast from a target sector that is not in the neighbor list of the mobile station's current source sector. In some situations, the mobile station may desire a handoff to such a target sector, perhaps if the mobile station is not receiving a desired quality of service from the source sector, or perhaps if the mobile station is moving away from the source sector and towards the target sector, etc. Should the mobile station request a handoff to the target sector using normal procedures via the source sector, the source sector may be unable to identify the target sector due to the target sector not appearing in the source-sector neighbor list, and the handoff may fail. Should the mobile station be on an active call when sending an access probe to the target sector, the target sector may interpret that signaling as a call-setup request, and in turn cause the active call to be dropped in the process of providing service—or attempting to provide service—to the mobile station.

Methods and systems are provided for facilitating a handoff to a target sector that is not in the neighbor list of a mobile station's current source sector. In one aspect, an embodiment may take the form of a method comprising a mobile station detecting (i) that a target sector is a handoff candidate and (ii) that the target sector is not listed in a neighbor list of a source sector; requesting to be served by the target sector at least in part by sending an access probe to the target sector; and transitioning from engaging in an active communication session via a communication path not including the target sector to doing so via a communication path that does include the target sector. The access probe may include an indication that the mobile station is in an active state. In another aspect, an embodiment may take the form of a mobile station programmed to carry out the above-described methods. In another aspect, an embodiment may take the form of at least one network entity carrying out the one or more network-side aspects that may facilitate the above-described method.

These as well as other aspects and advantages will become apparent to those of ordinary skill in the art by reading the following detailed description, with reference where appropriate to the accompanying drawings.

BRIEF DESCRIPTION OF THE DRAWINGS

Various embodiments are described herein with reference to the following drawings, wherein like numerals denote like entities.

DETAILED DESCRIPTION

1. Examples of Architecture a. Example Communication System

Figure 1:
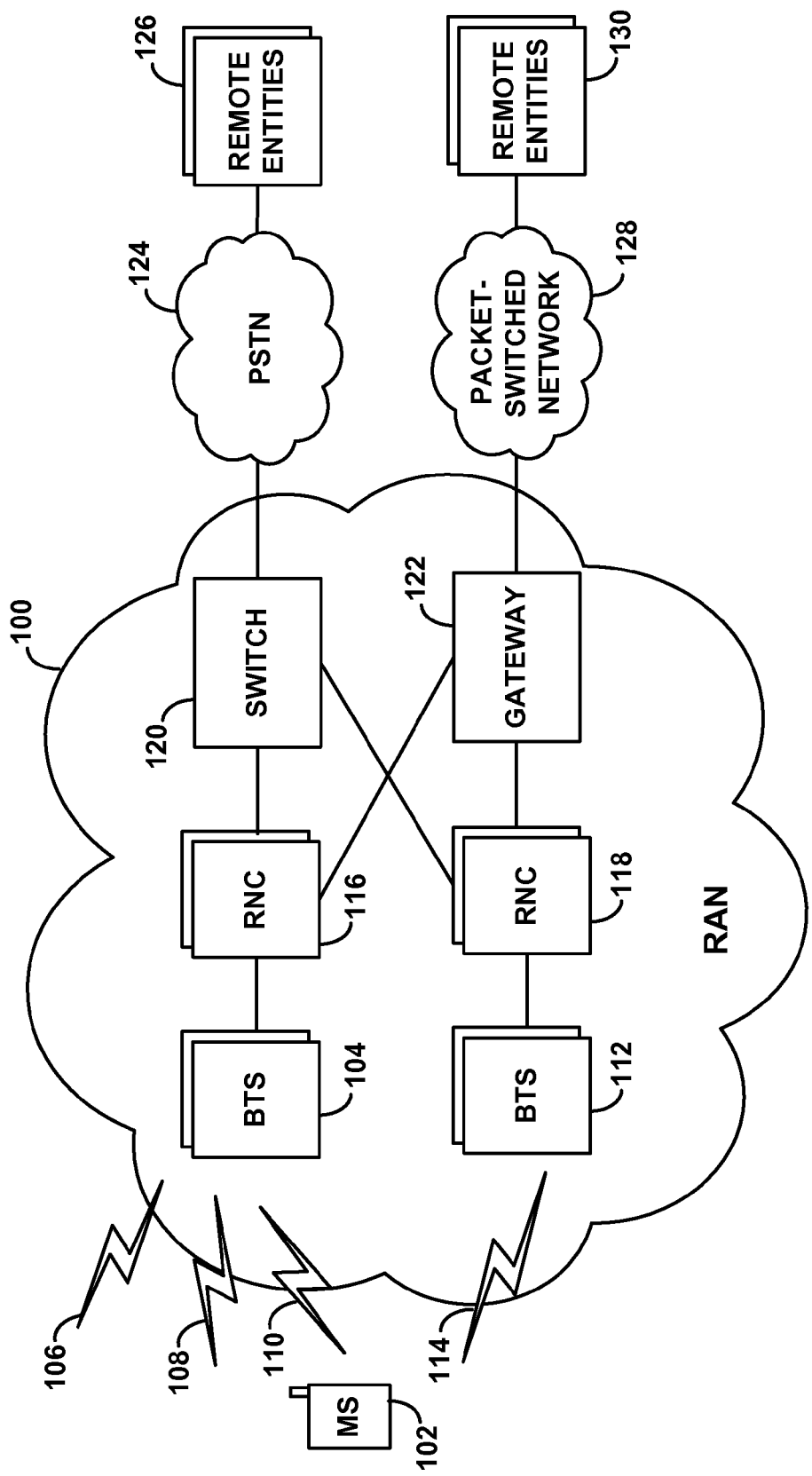
FIG. 1 depicts a communication system in which at least one embodiment may be carried out.

Referring to the drawings, FIG. 1 depicts a cellular communication system in which at least one embodiment may be carried out. It should be understood, however, that this and other arrangements and functions described herein are presented for purposes of example only, and that numerous variations are possible. For instance, elements can be added, omitted, combined, distributed, reordered, or otherwise modified. Further, where this document mentions functions that can be carried out by one or more devices, systems, or other entities, it should be understood that the functions may be implemented by software (e.g., machine language instructions stored in data storage and executed by a processor), firmware, or hardware.

As shown in FIG. 1, the example communication system includes at its core a RAN 100 that is arranged to provide multiple mobile stations with wireless communication service. FIG. 1 depicts a representative mobile station 102 by way of example, which could be a cell phone, access terminal, wirelessly equipped PDA, or other type of wirelessly equipped device now known or later developed. Each mobile station is equipped with hardware, software, and other logic to communicate with RAN 100 in accordance with an agreed air interface communication protocol, such as CDMA (e.g., 1xRTT, 1xEV-DO, etc.), iDEN, WiMAX, TDMA, AMPS, GSM, GPRS, UMTS, EDGE, LTE, or any other communication protocol now known or later developed.

RAN 100 includes one or more BTSs that radiate to define a plurality of sectors in which mobile stations can communicate with the RAN. As one example, BTS 104 radiates to define sectors 106, 108, and 110. As another example, BTS 112 radiates to define sector 114. The BTSs may define these sectors discretely through use of directional antennas or by various modulation parameters, including, without limitation, carrier frequencies and PN offsets or other parameters, depending on the air-interface protocol used.

In an example implementation, each sector will have a sector identifier that distinguishes the sector from adjacent sectors. Further, each sector is arranged to support multiple radio links or connections, distinguished from each other by radio-link identifiers (e.g., Walsh codes, MAC Indexes, or other identifiers). When a mobile station operates in a given sector, forward-link communications from the BTS to the mobile station may be carried on a given frequency and may designate or embody the sector's sector identifier, such as a PN offset, and possibly an applicable radio-link identifier.

In this manner, a mobile station may receive and evaluate signals corresponding to particular sectors transmitted by the RAN. For example, the mobile station may receive and evaluate a pilot signal that the RAN transmits in the sector on a particular Walsh code. Further, the RAN may assign the mobile station a Walsh code for a traffic channel, and the RAN may then communicate bearer traffic to the mobile station on that traffic channel, encoded with the assigned Walsh code. As another example, the mobile station may receive and evaluate status or informational messages for particular sectors. Such signals may include RABs, sector parameter messages, neighbor list update messages, access parameter messages, conflict messages, or other signaling messages specific to a sector. Mobile stations and other network entities may record signaling trends of particular sectors by recording these messages.

Returning to FIG. 1, BTS 104 is shown coupled with RNC 116, and BTS 112 is shown coupled to RNC 118. RNCs 116 and 118 are shown coupled with a switch 120 and a gateway 122. The switch 120 is then shown providing connectivity with the PSTN 124 so as to facilitate communication with remote entities 126, and the gateway 122 is shown providing connectivity with a packet-switched network 128 such as the Internet so as to facilitate communication with other remote entities 130. RNCs 116 and 118 are shown as sharing a switch and a gateway, but they could just as easily be coupled to different switches and different gateways.

In typical practice, each RNC may control one or more BTSs and may work with the BTSs to manage aspects of air-interface operation such as assignment of radio-link identifiers, handoff between sectors, and power control. Further, the switch or gateway may work with the RNCs to manage various aspects of RAN operation as well. Ultimately, the extent to which various RAN functions are carried out by an RNC, a BTS, a switch, a gateway, or one or more other RAN components may vary from implementation to implementation and is therefore not critical to an understanding or definition of the present methods and systems.

When a mobile station that is not in an active state sends a connection request in a sector, the BTS serving that sector may then forward the connection request to the RNC, and, upon approval by the RNC or switch, the BTS may arrange for the mobile station to operate on that sector and may notify the RNC or switch of the arrangement. That sector then becomes the mobile station's current source sector. A mobile station may operate on multiple sectors at the same time, in which all currently serving sectors may be deemed source sectors and the set of all currently serving sectors may be termed the mobile station's "active set."

When a mobile station in a source sector sends a handoff request to the source sector specifying a target sector, the BTS serving the source sector may then forward the handoff request to the RNC, and, upon approval by the RNC or switch, the BTS may arrange for the mobile station to operate on the target sector alone, or on both the source sector and the target sector, and may notify the RNC or switch of the arrangement. The BTS and RNC or switch may then update their respective records for the mobile station, such as by adding the target sector to the mobile station's active set. In turn, when a mobile station's operation on a sector is terminated, the BTS and the RNC or switch may revise their records to show that the mobile station is no longer operating on the sector.

Various components of a RAN can work alone or in combination to carry out functions described herein. Which components are involved may depend on the particular network arrangement and air-interface protocol used.

b. Example Device

Figure 2:
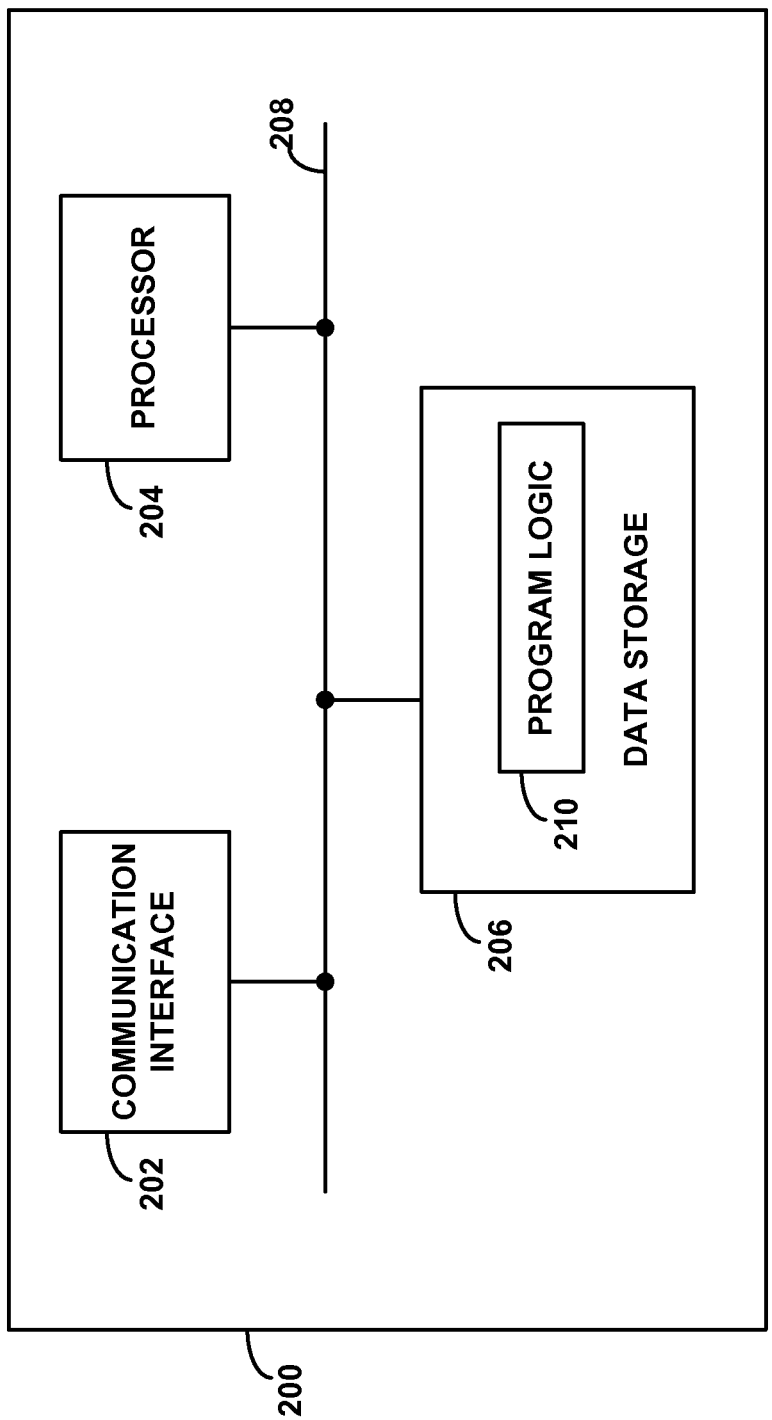
FIG. 2 depicts a device, in accordance with at least one embodiment.

FIG. 2 depicts an example device 200, which includes a communication interface 202, a processor 204, and data storage 206, all communicatively linked by a system bus or other suitable mechanism 208. Note that device 200 could have additional and/or different components, and that this structure is provided by way of example. Device 200 may be, for example, mobile station 102 or BTS 112.

Communication interface 202 may include any combination of hardware (e.g. a dedicated antenna), software, and/or firmware for transmitting data to and receiving data from network entities, over an air interface and/or over wired connections.

Processor 204 may comprise multiple (e.g. parallel) processors, such as a general-purpose microprocessor and/or a discrete digital-signal processor. The data storage 206 may take various forms, in one or more parts, such as a non-volatile storage block and/or a removable medium, and may contain program instructions 210 executable by processor 204 for carrying out the functions described herein.

2. Example Operation

Figure 3:
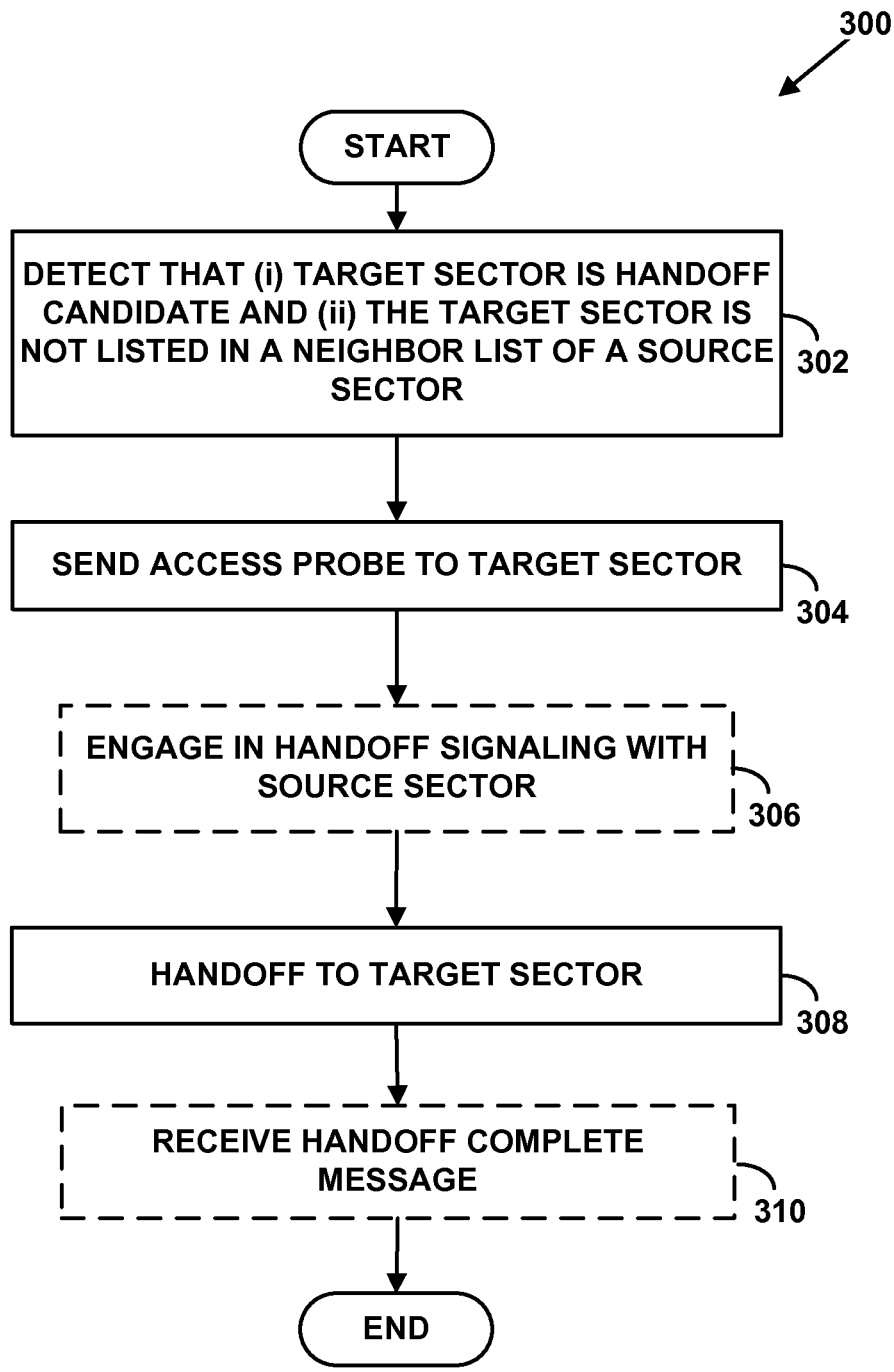
FIG. 3 depicts a flowchart of a method, in accordance with at least one embodiment.

FIG. 3 depicts a method 300, which may be carried out by a mobile station such as mobile station 102, or may be carried out by mobile station 102 in cooperation with one or more other entities. The arrangement of functions shown in FIG. 3 is an example and non-limiting. These functions could be re-ordered, combined, divided, or omitted, as appropriate for a particular embodiment. For illustration purposes, reference will be made to the entities and arrangements shown in FIG. 1, but other arrangements are possible. To set the stage for the example of FIG. 3, mobile station 102 is currently being served by source sector 110. Source sector 110 has a neighbor list that includes sectors 106 and 108. Sector 114, the target sector for this example, is not in the neighbor list of source sector 110. To begin, mobile station 102 is on an active call (i.e., in an active state) via a communication path that includes source sector 110 but does not include sector 114.

As shown in FIG. 3, method 300 begins at step 302, when mobile station 102 detects (i) that sector 114 is a handoff candidate and (ii) that sector 114 is not in the neighbor list of source sector 110. In an embodiment, mobile station 102 detects that sector 114 is a handoff candidate by monitoring the pilot signals of sector 114 and by determining that sector 114 has appropriate signal strength to support mobile station 102. In an embodiment, mobile station 102 detects that sector 114 is not in the neighbor list of source sector 110 by checking neighbor-list broadcasts or neighbor-list-update messages from sector 110 and by determining that the neighbor list of sector 110 does not include sector 114. The determination that sector 114 is not in the neighbor list of sector 110 may be the basis for mobile station 102 proceeding with the method of FIG. 3 rather than pursuing a typical handoff via source sector 110.

At step 304, responsive to the detecting in step 302, mobile station 102 sends an access probe to target sector 114, requesting to be served by sector 114. The access probe may indicate that mobile station 102 is in an active state. The active state indication may prevent sector 114 from responding to the access probe by engaging in typical call-setup signaling that could result in the active call of mobile station 102 being disconnected. The access probe may also indicate that target sector 114 is not in the neighbor list of source sector 110. These indications may take the form of data fields and/or state variables included the access probe, and/or other forms.

In at least one embodiment, at optional step 306, mobile station 102 may engage in handoff signaling with source sector 110. Source sector 110 may receive notification of the receipt of the access probe by target sector 114, such as by messages routed through common switch 120, and source sector 110 may initiate handoff signaling with mobile station 102 in response to the notification.

At step 308, mobile station 102 is handed off to target sector 114. In an embodiment, sector 114 may arrange to provide service to mobile station 102 such that the active state of mobile station 102 is undisturbed. Further, sector 114 may engage in signaling with sector 110 that results in sector 110 no longer serving mobile station 102. In another embodiment, mobile station 102 may have an active set that includes sector 110, and target sector 114 may be added to the active set of mobile 102. In that embodiment, after the handoff, mobile station 102 is served by both sectors 110 and 114. The handoff of step 308 may also be characterized as transitioning from engaging in a communication session (i.e., the active call) via a first communication path to doing so via a second communication path. The first communication path includes source sector 110 but not target sector 114, and the second communication path includes at least target sector 114.

In at least one embodiment, at optional step 310, mobile station 102 may receive a handoff-complete message, which may be sent by sector 114, and which may indicate that the handoff to sector 114 has been effected.

Figure 4:
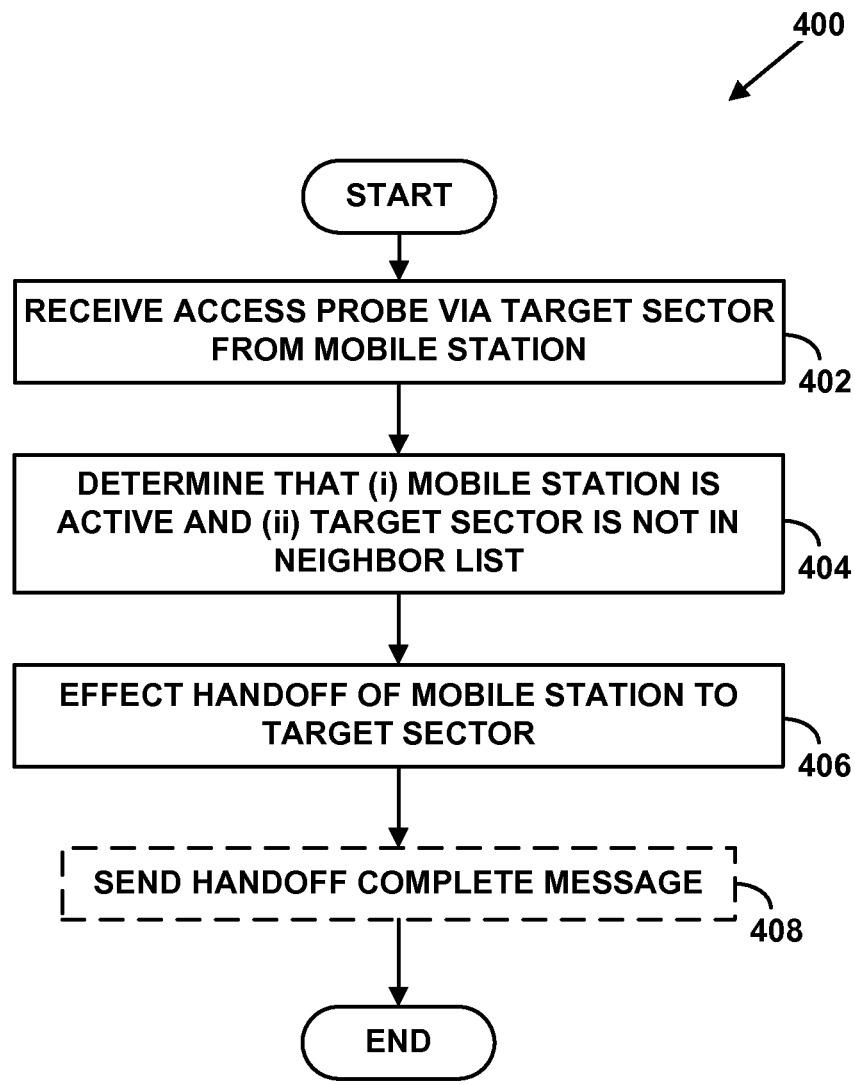
FIG. 4 depicts a flowchart of a method, in accordance with at least one embodiment.

Turning to FIG. 4, FIG. 4 depicts a method 400, which may be carried out by BTS 112 and/or one or more other network devices and/or entities. The arrangement of functions shown in FIG. 4 is an example and non-limiting. These functions could be re-ordered, combined, divided, or omitted, as appropriate for a particular embodiment. For illustration purposes, reference will again be made to the entities and arrangements shown in FIG. 1, but other arrangements are possible. Again, mobile station 102 is currently being served by source sector 110, which has a neighbor list that includes sectors 106 and 108. Sector 114, the target sector for this example, is not in the neighbor list of source sector 110. To begin, mobile station 102 is on an active call (i.e., in an active state) via a communication path that includes source sector 110 but does not include sector 114.

As shown in FIG. 4, method 400 begins at step 402, where an access probe is received via target sector 114 from mobile station 102. The entity receiving the access probe in sector 114 may be BTS 112, and/or any other network entity, such as RNC 118 or switch 120. (References to BTS 112 hereinafter are for simplicity of presentation, and should not be taken to be limiting.)

At step 404, BTS 112 determines (i) that mobile station 102 is active and (ii) sector 114 is not in the neighbor list of source sector 110 of mobile station 102. In at least one embodiment, the access probe may contain an indication of mobile station 102's active status and/or an indication of sector 114 not being in the neighbor list of source sector 110. In those embodiments, BTS 112 may determine that mobile station 102 is active and/or that sector 114 is not in the neighbor list of sector 110 by identifying the appropriate data from the access probe. In an embodiment, BTS 112 may determine that mobile station 102 is in an active state by querying call-status records for mobile station 102, these records perhaps being maintained by a network entity. In one or more embodiments, BTS 112 may determine that sector 114 is not on the neighbor list of sector 110 by querying sector 110 and/or by querying neighbor-list records, these records perhaps being maintained by a network entity.

At step 406, BTS 112 effects a handoff of mobile station 102 to sector 114, such as explained above with reference to FIG. 3. After the handoff, mobile station 102 is served by at least sector 114.

In at least one embodiment, at optional step 408, BTS 112 sends a handoff-complete message to mobile station 102, indicating that the handoff has been effected. In at least one embodiment, sector 110 (or BTS 104 in sector 110) sends the handoff complete message.

Example embodiments of the methods and systems have been described above. Those of ordinary skill in the art will appreciate, however, that modifications may be made to these embodiments while remaining within the scope defined by the claims.

I claim:

1. A method comprising:
   a mobile station that is initially engaged in a communication session via a first communication path detecting that (i) a target sector is a handoff candidate and (ii) the target sector is not listed in a neighbor list of a source sector, wherein the first communication path comprises the source sector but does not comprise the target sector;

responsive to the detecting, the mobile station requesting to be served by the target sector at least in part by sending an access probe to the target sector, wherein the access probe includes an indication that the mobile station is in an active state; and as a result of the sending, the mobile station transitioning from (i) engaging in the communication session via the first communication path to (ii) engaging in the communication session via a second communication path, wherein the second communication path does comprise the target sector.

2. The method of claim 1, wherein the second communication path does not comprise any sectors other than the target sector.

3. The method of claim 1, wherein the second communication path further comprises the source sector.

4. The method of claim 1, wherein the second communication path does not comprise the source sector.

5. The method of claim 1, wherein the transitioning comprises the target sector being added to an active set of the mobile station.

6. The method of claim 1, wherein the access probe includes an indication that the target sector is not in the neighbor list of the source sector.

7. The method of claim 1, wherein, as a result of sending the access probe, the mobile station engages in handoff signaling with the source sector.

8. The method of claim 1, further comprising, after the sending, the mobile station receiving a message indicating that a handoff to the target sector has been effected.

9. A method comprising:
at least one network device receiving via a target sector an access probe from a mobile station;

the at least one network device determining that (i) the mobile station is in an active state and (ii) the target sector is not in a neighbor list of a source sector serving the mobile station; and responsive to the determining, the at least one network device effecting a handoff of the mobile station to the target sector.

10. The method of claim 9, wherein the effecting comprises adding the target sector to an active set of the mobile station.

11. The method of claim 9, wherein the effecting comprises causing the mobile station to communicate via the target sector and not via the source sector.

12. The method of claim 9, wherein, after the effecting, the at least one network device sends a message to the mobile station indicating that the handoff to the target sector has been effected.

13. The method of claim 9, further comprising the at least one network device engaging in handoff signaling with the mobile station.

14. The method of claim 9, wherein the access probe includes an indication that the mobile station is in an active state, and wherein determining that the mobile station is in an active state comprises identifying that the access probe includes the indication.

15. The method of claim 9, wherein the access probe includes an indication that the target sector is not in the neighbor list of the source sector, and wherein determining that the target sector is not in the neighbor list of the source sector comprises identifying that the access probe includes the indication.

16. A system comprising at least one network device, the at least one network device comprising:
at least one communication interface;
at least one processor; and
data storage containing instructions executable by the at least one processor for carrying out functions including (i) receiving via a target sector an access probe from a mobile station; (ii) determining that (a) the mobile station is in an active state and (b) the target sector is not in a neighbor list of the source sector; and (iii) responsive to the determining, effecting a handoff of the mobile station to the target sector.

17. The system of claim 16, wherein the effecting comprises adding the target sector to an active set of the mobile station.

18. The system of claim 16, wherein the effecting comprises causing the mobile station to communicate via the target sector and not via the source sector.

19. The system of claim 16, wherein the functions further include sending a message to the mobile station indicating that the handoff to the target sector has been effected.

20. The system of claim 16, wherein the access probe includes an indication that the mobile station is in an active state, and wherein determining that the mobile station is in an active state comprises identifying that the access probe includes the indication.

21. The system of claim 16, wherein the access probe includes an indication that the target sector is not in the neighbor list of the source sector, and wherein determining that the target sector is not in the neighbor list of the source sector comprises identifying that the access probe includes the indication.

* * * * *